United States Patent
Aghadavoodi Jolfaei et al.

(10) Patent No.: US 12,309,155 B2
(45) Date of Patent: May 20, 2025

(54) INTELLIGENT FIREWALL RULE HANDLING

(71) Applicant: SAP SE, Walldorf (DE)

(72) Inventors: Masoud Aghadavoodi Jolfaei, Wiesloch (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 18/223,228

(22) Filed: Jul. 18, 2023

(65) Prior Publication Data

US 2025/0030690 A1    Jan. 23, 2025

(51) Int. Cl.
*H04L 9/40* (2022.01)

(52) U.S. Cl.
CPC ........ *H04L 63/101* (2013.01); *H04L 63/0263* (2013.01); *H04L 63/0846* (2013.01); *H04L 63/108* (2013.01)

(58) Field of Classification Search
CPC ............... H04L 63/101; H04L 63/0263; H04L 63/0846; H04L 63/108
See application file for complete search history.

(56) References Cited

U.S. PATENT DOCUMENTS

| | | | |
|---|---|---|---|
| 11,178,150 B1* | 11/2021 | Lie | H04L 63/101 |
| 2011/0154469 A1* | 6/2011 | Dargis | H04L 63/0263 |
| | | | 726/11 |
| 2017/0220793 A1* | 8/2017 | Birgisson | G06F 21/62 |
| 2018/0075250 A1* | 3/2018 | Chasman | G06F 21/6227 |

* cited by examiner

*Primary Examiner* — Amie C. Lin
(74) *Attorney, Agent, or Firm* — SCHWEGMAN LUNDBERG & WOESSNER, P.A.

(57) ABSTRACT

A computer-implemented method may comprise receiving, from a client application running within a client network, a request for a server application running within a server network to perform an action, and then generating, by the client network, a modified version of the request for the server application to perform the action, where the modified version of the request for the server application to perform the action comprises an access token configured to be used by the server network to allow an update of an access control list for the server application. The client network may then send, to the server network, the modified version of the request for the server application to perform the action.

20 Claims, 9 Drawing Sheets

INTELLIGENT FIREWALL RULE HANDLING

BACKGROUND

Cloud services are often safeguarded through firewalls and their rules for incoming or outgoing network traffic to protect networks from unauthorized access or malicious attacks. The firewall rules are used to filter traffic based on specific criteria. An access control list, also known as a whitelist, may be used to administer and control which client Internet Protocol (IP) addresses, and sometimes which ports, are permitted to access the cloud services, thereby ensuring that only authorized client applications can access the cloud services and blocking unauthorized client applications from accessing the cloud services. By using firewall rules, cloud services can ensure that only approved users and systems can access their resources, which can help protect sensitive data and prevent unauthorized access to critical applications or services from potentially malicious sources, such as hackers or bots attempting to exploit vulnerabilities in the service.

One major challenge that arises in firewall rule handling is in identifying the appropriate IP address and port that should be whitelisted for a client application. The IP address could be the IP address of an organization's network or it could be a specific IP address associated with a remote user or system that needs to access the cloud service. In many cases, the IP address is translated or mapped from a local network (e.g., an intranet) IP address through different intermediaries, such as a Network Address Translation (NAT) component, to an external IP address when a client application is attempting to communicate with external applications or resources. Similarly, the internal port identifier of the client application may be translated into an external port identifier as well. . . . In certain cases, the determination of the correct IP address and port identifier to be whitelisted at a cloud service may be very time-consuming and require interaction with the different infrastructure teams, which often endangers the availability of the cloud services.

Many Internet service providers (ISPs) use dynamic IP addresses, which means that the IP address associated with a device can change over time or the IP address assigned to a computer (e.g., residing on a corporate network) is dynamic and changes each time after a restart of the computer. Additionally, with the rise of remote work, employees may need to access cloud services from various locations and devices, each with a unique IP address. Whitelisting these IP addresses may require additional coordination and tracking to ensure that only authorized IP addresses are added to the whitelist. Furthermore, the use of virtual private networks to establish a secure tunnel also leads to changing of the IP addresses, thereby complicating the process of identifying the correct IP address for the whitelisting.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
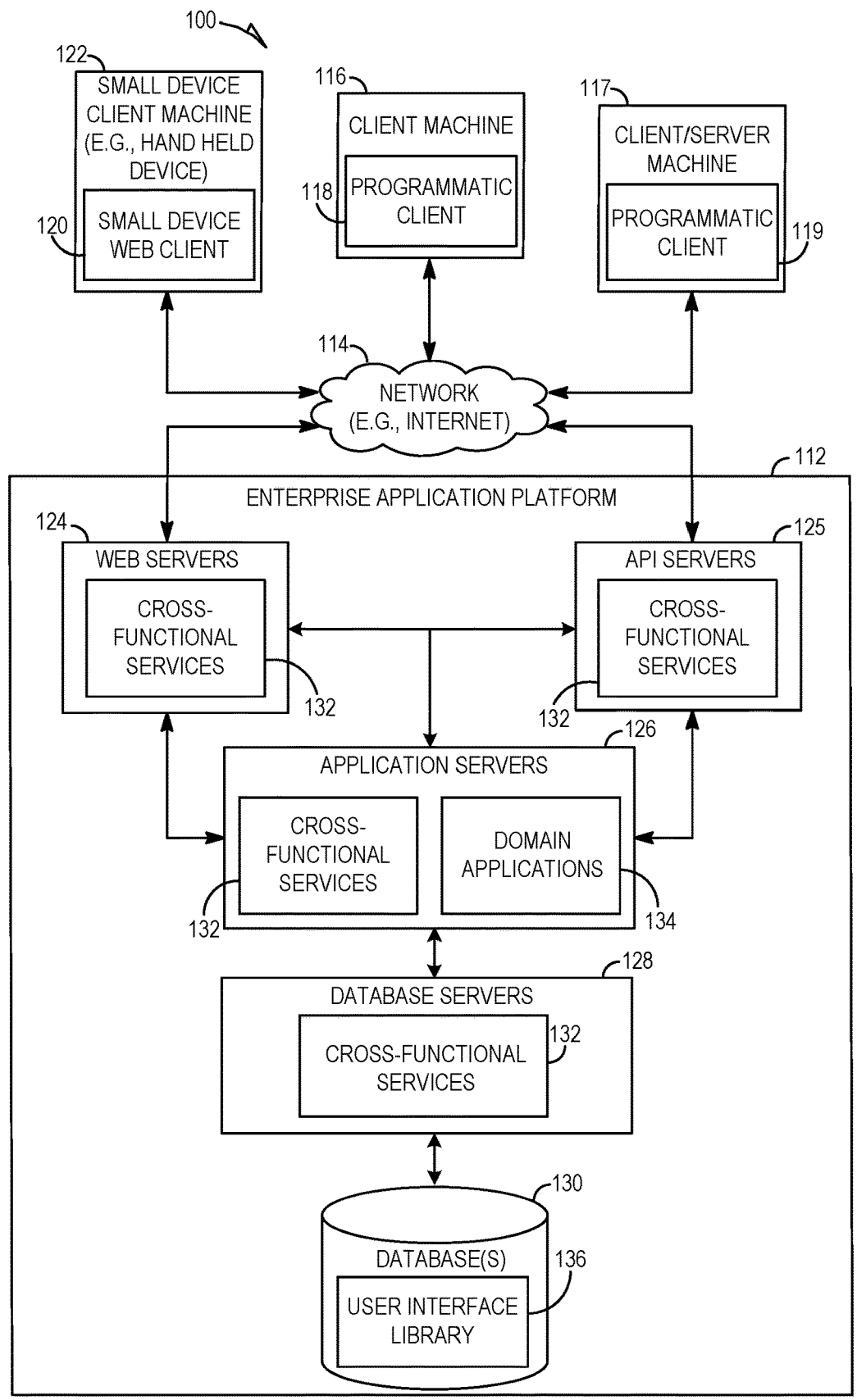
FIG. 1 is an example network diagram illustrating a system.

Example methods and systems of implementing intelligent firewall rule handling are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement intelligent firewall rule handling. In some example embodiments, a computer system may implement intelligent firewall rule handling by using an access token to enable a client network to dynamically trigger an update of an access control list for a server application on a server network to include an external IP address corresponding to a client application within the client network that is attempting to access the server application.

In some example embodiments, a computer-implemented method comprises receiving a request for a server application running within a server network to perform an action from a client application running within a client network, obtaining an external Internet Protocol (IP) address for the client application, where the external IP address has been generated based on an internal IP address of the client application using a network address translation process, and sending, from the client network to the server network, a request to update an access control list for the server application to include the external IP address for the client application, where the request to update the access control list comprises an access token configured to be used by the server network to allow the update of the access control list. Subsequent to the sending of the request to update the access control list, the client network may send, to the server network, a modified version of the request for the server application to perform the action, where the modified version of the request for the server application to perform the action including the external IP address.

On the server network side, the server network may receive the request to update the access control list from the client network, obtain authorization to update the access control list using the access token of the request to update, and update the access control list for the server application to include the external IP address for the client application in response to obtaining the authorization to update the access control list. Next, the server network may receive the modified version of the request for the server application to perform the action subsequent to the updating of the access control list, and determine that the external IP address included in the modified version of the request for the server application to perform the action is included in the updated access control list. The server application may then perform the action based on the determining that the external IP address is included in the updated access control list.

In some example embodiments, the access token may be included in each request by the client network for the server application to perform the action, such that the server network initiates the request to update the access control list on behalf of the client network using the access token rather than the client network explicitly requesting the update of the access control list. For example, a computer-implemented method may comprise receiving, from a client application running within a client network, a request for a server application running within a server network to perform an action, and then generating, by the client network, a modified version of the request for the server application to perform the action, where the modified version of the request for the server application to perform the action comprises an access token configured to be used by the server network to allow an update of an access control list for the server application. The client network may then send, to the server network, the modified version of the request for the server application to perform the action.

On the server network side, the server network may receive, from the client network, the modified version of the request for the server application to perform the action, obtaining authorization to update the access control list using the access token of the request to update, and then update the access control list for the server application in response to obtaining the authorization to update the access control list. The server application may then perform the action based on the updating of the access control list for the server application.

By using the access token to dynamically update the access control list of the server application to include the external IP address (and, in some cases, the external port identifier) of the client application in the context of a request by the client application to access the server application, the access control system disclosed herein increases the resiliency of the server network to handle changes in the IP addresses of client applications requesting access to the server application and reduces the electronic interactions and communications between users involved in manually updating the access control list. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
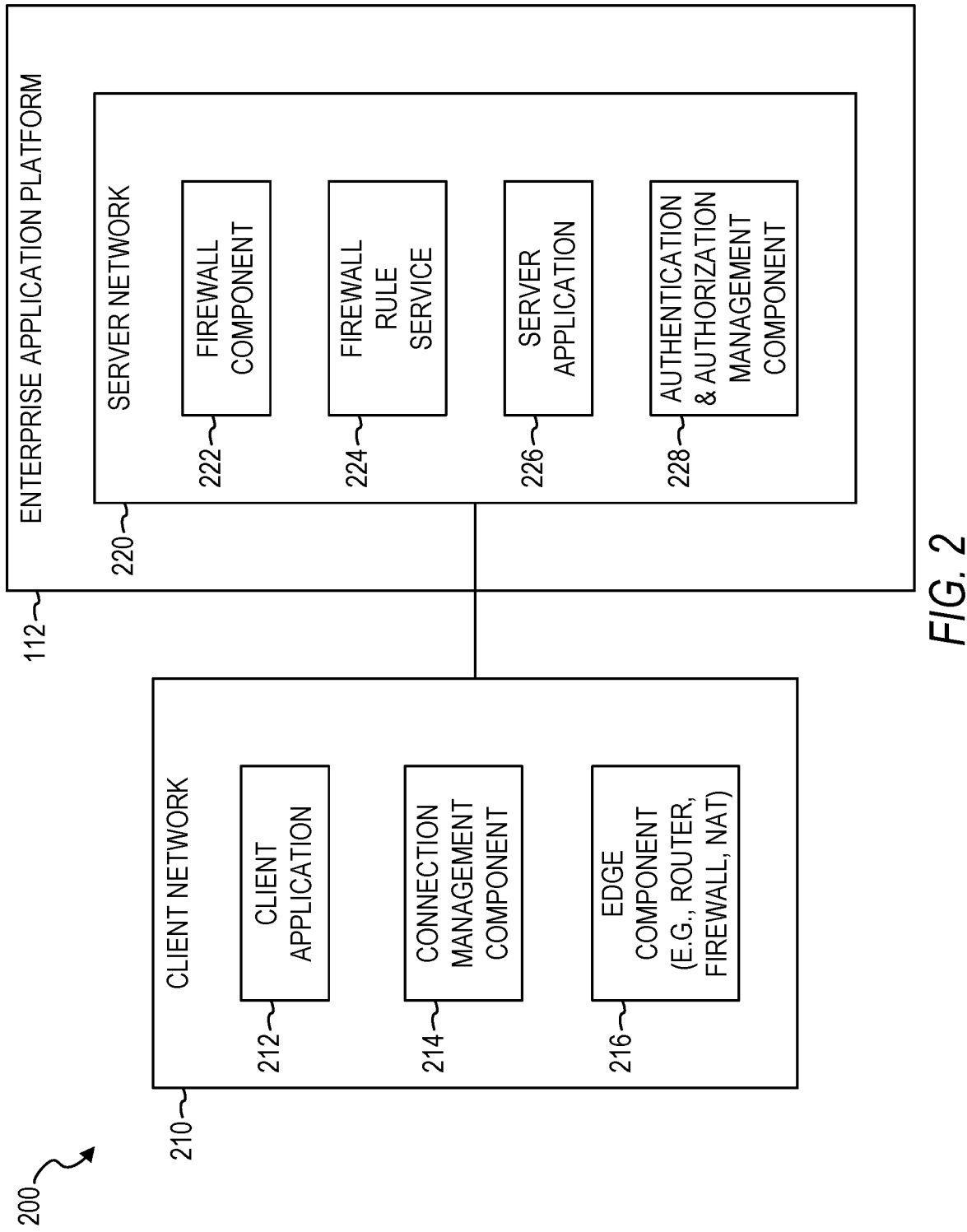
FIG. 2 is a block diagram illustrating an example access control system.

FIG. 2 is a block diagram illustrating an example access control system 200. The access control system 200 may be configured to implement intelligent firewall rule handling to enable one or more components of a client network 210 to securely and efficiently access one or more components of a server network 220. The client network 210 may comprise one or more client applications 212, a connection management component 214, and an edge component 216. The server network 220 may comprise a firewall component 222, a firewall rule service 224, a server application 226, and an authentication and authorization management (AAM) component 228.

The components shown in FIG. 2 may be configured to communicate with each other via one or more network connections, such as via the network 114 in FIG. 1. In some example embodiments, one or more of the components of the access control system 200 may be implemented by the enterprise application platform 112 of FIG. 1. For example, the server network 220 may be incorporated into the enterprise application platform 112. The client network 210 may also be incorporated into the enterprise application platform 112, or, alternatively, may be incorporated into an on-premises system. However, the access control system 200 may be implemented in other ways as well.

In some example embodiments, the client application 212 may comprise an on-premises software application or a cloud-based software application. Users may access and use the client application 212 via computing devices (e.g., the client machine 116 or the small device client machine 122 in FIG. 1) on which the client application 212 resides or that communicate with the client application 212, such as via a network connection (e.g., the network 114 in FIG. 1). Furthermore, the client application 212 may comprise enterprise resource planning (ERP) or other business management software that an organization can use to collect, store, manage, and interpret data from many business activities. The client application 212 may also be configured to perform analytics functions, including, but not limited to, reporting, online analytical processing, analytics, data mining, process mining, complex event processing, predictive analytics, and prescriptive analytics. The client application 212 may comprise other types and configurations of software applications as well. In some example embodiments, the client application 212 may be configured to issue a request for the server application 226 to perform an action. The action may comprise an execution of a database query, such as a structured query language (SQL) statement. However, the client application 212 may request that the server application 226 perform other types of actions as well.

The connection management component 214 may be configured to manage the connection and communication of the client application 212 with other software applications, such as the server application 226. The connection management component 214 may receive the request for the server application 226 to perform the action from the client application 212 and send the request to the edge component 216. In some example embodiments, the connection management component 214 may include the internal IP address and port identifier of the client application 212 in the request that it sends to the edge component 216. The internal IP address is a local IP address that is hidden from components that are external to the client network 210. The internal IP address may be assigned by a router of the client network 210. The internal IP address may be configured to identify a particular machine in the client network 210 on which the client application 212 resides, while the internal port identifier may be configured to identify the particular client application 212 itself. The internal port identifier may also be assigned by the router of the client network 210 or by the machine on which it resides.

The edge component 216 may comprise a hardware or software component that is located at the boundary of the client network 210 and that controls network traffic into and out of the client network 210. The edge component 216 may comprise a router. In some example embodiments, the edge component 216 is configured to perform a network address translation (NAT) process that translates the internal IP address in the request from the client application 212 into an external IP address. The edge component 216 may then modify network address information in the IP header of the request packets of the request to be sent to the server network 220. The edge component 216 may also be configured to translate the internal port identifier of the client application 212 in the request to an external port identifier. As a result of this translation performed by the edge component 216, the external IP address and the external port identifier may be used to hide the internal IP address and the internal port identifier of the client application 212 from components that are external to the client network 210, such as from the components of the server network 220. The edge component 216 may be configured to send a modified version of the request, substituting the external IP address and external port identifier for the internal IP address and internal port identifier, to the server network 220.

In some example embodiments, the firewall component 222 of the server network 220 may be configured to receive the request for the server application 226 to perform the action from the edge component 216 of the client network 210. The firewall component 222 may comprise a load balancer configured to act as a reverse proxy and distribute requests across a number of servers, applications, or other components of the server network 220. The firewall component 222 may use the firewall rule service 224 to determine whether to allow the request for the server application 226 to perform the action to pass through the firewall component 222 to the server application 226 or to block the request from being sent to the server application 226. The firewall rule service 224 may store and manage a set of firewall rules for the server application 226 and for other components of the server network 220 that include rules, policies, or criteria that controls access to the components of the server network 220, such as the server application 226. The firewall rules may comprise an access control list that includes IP addresses and port identifiers from which to allow traffic through to the server application 226. The access control list may include specific IP addresses and specific port identifiers, as well as a range of IP address and a range of port identifiers.

The firewall rule service 224 may check its access control list to determine whether the IP address and the port identifier included in the request received by the firewall component 222 is included in the access control list. If the firewall rule service 224 determines that the IP address and the port identifier are included in the access control list, then the firewall rule service 224 may notify the firewall component 222 that it was successful in finding the IP address and the port identifier in the access control list, and the firewall component 222 may permit the connection between client application 212 and the server application 226, and forward the request to perform the action from the client application 212 to the server application 226. If the firewall rule service 224 determines that the IP address and the port identifier are not included in the access control list, then the firewall rule service 224 may notify the firewall component 222 of the failure to find the IP address and port identifier in the access control list, and the firewall component 222 may refuse to connect the client application 212 with the server application 226, denying the request issued by the client application 212. The firewall component 222 may send a connection refusal or denial of the request to the edge component 216, which may relay the connection refusal or denial of the request to the connection management component 214.

The server application 226 may comprise a cloud-based software application. Users may access and use the server application 226 via computing devices (e.g., the client machine 116 or the small device client machine 122 in FIG. 1) that communicate with the server application 212, such as via a network connection (e.g., the network 114 in FIG. 1). Furthermore, the server application 226 may comprise a database-as-a-service software application that enables users to manage a cloud database system. The server application 226 may also comprise enterprise resource planning (ERP) or other business management software that an organization can use to collect, store, manage, and interpret data from many business activities. The server application 226 may also be configured to perform analytics functions, including, but not limited to, reporting, online analytical processing, analytics, data mining, process mining, complex event processing, predictive analytics, and prescriptive analytics. The server application 226 may comprise other types and configurations of software applications as well. In some example embodiments, the server application 226 may be configured to execute and response to requests from the client application 212, such as by executing a database query and sending the results of the database query back to the client application 212.

The AAM component 228 may be configured to perform authentication and authorization processes for the firewall rule service 224 and for the server application 226. Authentication is a process that verifies that someone or something is who they say they are, such as by verifying a user identification and password or a digital certificate. Authorization is a security process that determines a user's or application's level of access in order to determine whether to permit access to a resource or to perform a requested action.

In some example embodiments, the connection management component 214 may be configured to obtain the external IP address corresponding to the internal IP address of the client application 212. The connection management component 214 may also obtain the external port identifier corresponding to the internal port identifier of the client application 212. The connection management component 214 may send, to the server network 220, a request to update an access control list for the server application 226 to include the external IP address and the external port identifier for the client application 212. The request to update the access control list may comprise the external IP address and the external port identifier, as well as an access token configured to be used by the firewall rule service 224 to allow and perform the requested update of the access control list. In some example embodiments, the connection management component 214 may be configured to send the request to update the access control list to the server network 220 in response to receiving, from the server network 220, a denial of a request by the client application 212 to access the server application 226.

The access token may comprise one or more security credentials that are configured to verify the right of the client application 212 to access the server application 226. The access token may comprise information about the client application 212 (or a user of the client application 212), including permissions and expirations, as well as verification data that the firewall rule service 224 may use to verify the authenticity of the access token. In some example embodiments, a user, such as an administrative user, may use the firewall rule service 224 to generate the access token, such as by accessing a user interface of the firewall rule service 224 (e.g., via a computing device communicatively connected to the firewall rule service 224), and using the user interface of the firewall rule service 224 to direct the creation of the access token. For example, the user may log in to a web-based management interface of the firewall rule service 224 that allows the user to manage the security settings and configuration of the firewall rule service 224. The user may then use the management interface to create the access token, which may be generated based on input provided by the user or may be a randomly generated. The access token may be stored by the firewall rule service 224 and the AAM component 228 for subsequent use when determining whether to permit or deny the request to update the access control list for the server application 226 to include the external IP address and the external port identifier for the client application 212. The access token may comprise security options, such as a time period for which the access token is valid configured to restrict the access token to being valid for only a limited period of time, as well as a specification of one or more permitted geographical locations configured to restrict the access token to being valid for only a limited set of one or more geographical locations for the client application 212. In some example embodiments, the connection management component 214 may store the access token for subsequent use in generating the modified version of the request for the server application 226 to perform the action. The access token may be sent from the firewall rule service 224 to the connection management component 214 for registration and storage with the connection management component 214 or the access token may be entered or otherwise provided to the connection management component 214 by the user via a user interface of the connection management component 214. The connection management component 214 may retrieve the access token and include it in the request to update the access control list when generating the request to update the access control list.

Figure 3:
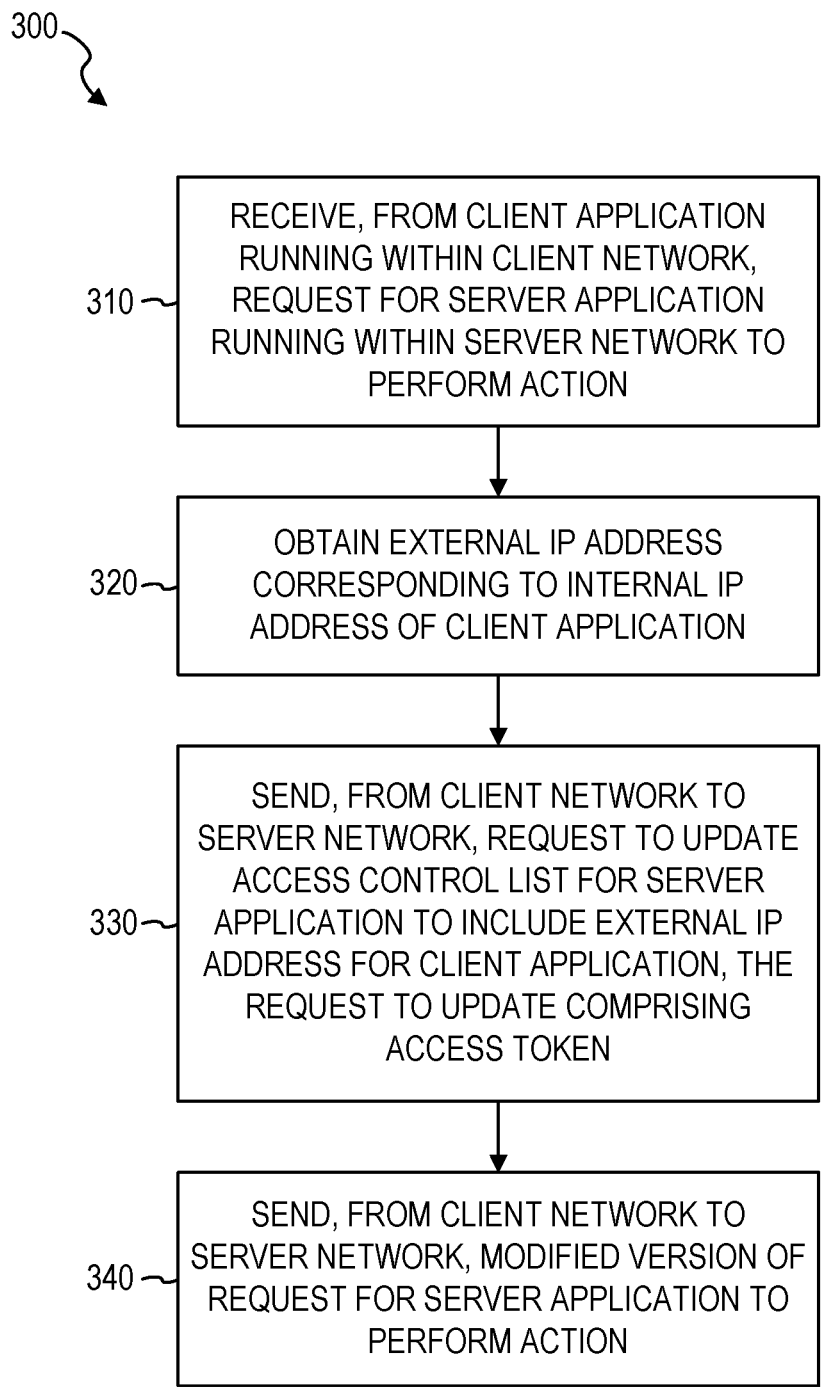
FIG. 3 is a flowchart illustrating an example method of implementing intelligent firewall rule handling.

FIG. 3 is a flowchart illustrating an example method 300 of implementing intelligent firewall rule handling. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the client network 210 of FIG. 2 or any combination of one or more of its components (e.g., the client application 212, the client connection component 214, the edge component 216).

At operation 310, the client network 210 may receive, from a client application 212 running within the client network 210, a request for a server application 226 running within a server network 220 to perform an action. The action may comprise an execution of a database query, such as a structured query language (SQL) statement. However, other types of actions are also within the scope of the present disclosure.

The client network 210 may, at operation 320, obtain an external Internet Protocol (IP) address corresponding to an internal IP address of the client application 212. The external IP address may have been assigned to the client application 212 by an edge component 216 of the client network 210. In some example embodiments, the external IP address may have been generated by the edge component 216 using a network address translation (NAT) process. However, the external IP address may have been generated in other ways as well. The client network 210 may also obtain an external port identifier corresponding to an internal port identifier of the client application 212. The external port identifier may have been assigned to the client application 212 by the edge component 216 of the client network 210.

Next, the client network 210 may send, to the server network 220, a request to update an access control list for the server application 226 to include the external IP address for the client application 212, at operation 330. The request to update the access control list may comprise an access token configured to be used by the server network 220 to allow the update of the access control list. In some example embodiments, the sending of the request to update the access control list for the server application 226 to include the external IP address for the client application 212 may be performed in response to receiving, from the server network 220, a denial of a request by the client application 212 to access the server application 226. The validity of the access token may be restricted based on one or more parameters or conditions. For example, the access token may be restricted to being valid for only a limited period of time. Additionally or alternatively, the access token may be restricted to being valid for only a limited set of one or more geographical locations for the client application. Other types of restrictions on the validity of the access token are also within the scope of the present disclosure. In some example embodiments, the request to update the access control list for the server application 226 to include the external IP address for the client application 212 further comprises a request to include the external port identifier of the client application 212 as well. The edge component 216 may determine the external IP address and the external port identifier, and then add, insert, or otherwise include the external IP address and the external port identifier in the header of the request.

At operation 340, the client network 210 may then, subsequent to the sending of the request to update the access control list, send, to the server network 220, a modified version of the request for the server application 226 to perform the action. The modified version of the request for the server application 226 to perform the action may include the external IP address. In some example embodiments, the modified version of the request for the server application 226 to perform the action may also include the external port identifier. The edge component 216 may determine the external IP address and the external port identifier, and then add, insert, or otherwise include the external IP address and the external port identifier in the header of the request.

It is contemplated that any of the other features described within the present disclosure can be incorporated into the method 300.

Figure 4:
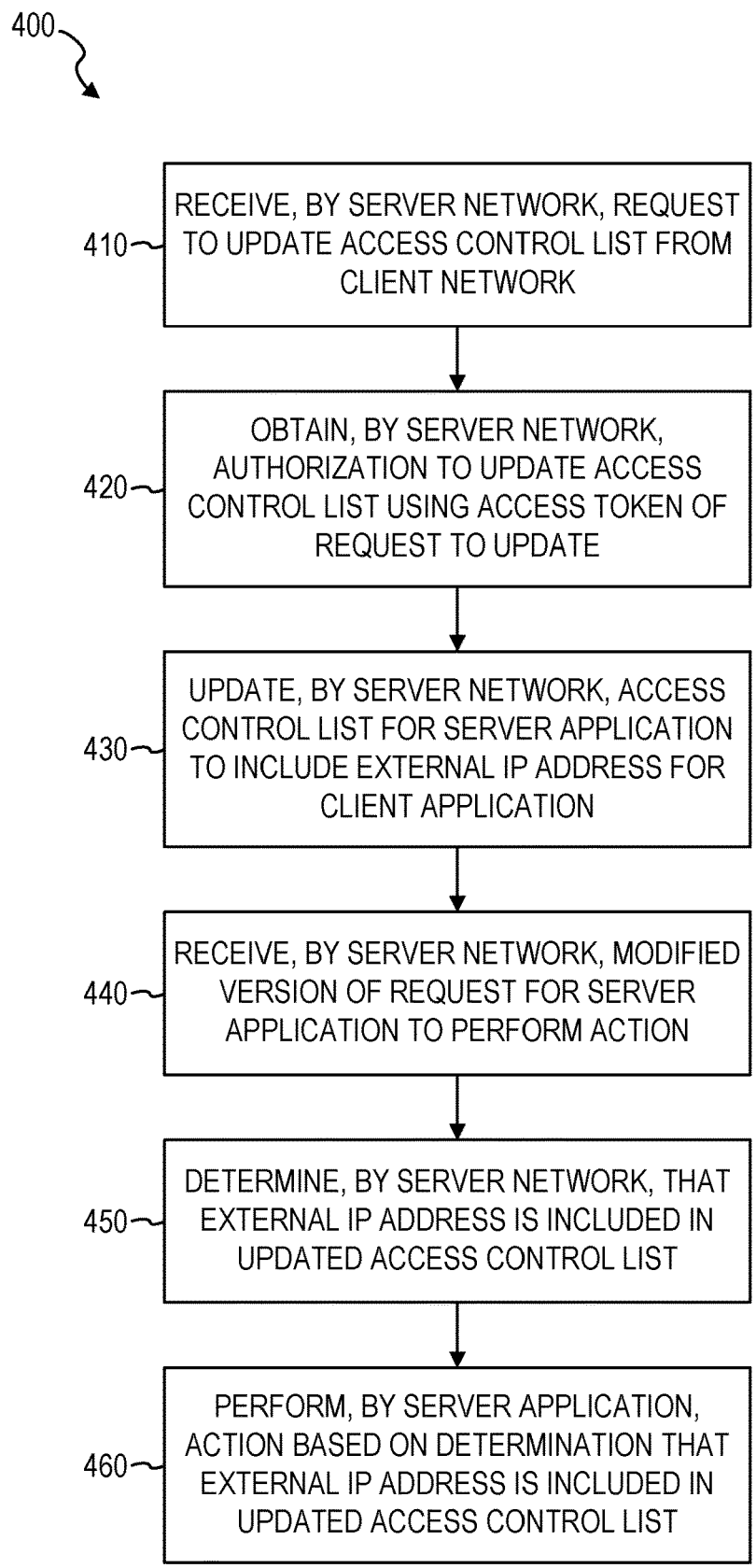
FIG. 4 is a flowchart illustrating another example method of implementing intelligent firewall rule handling.

FIG. 4 is a flowchart illustrating another example method 400 of implementing intelligent firewall rule handling. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the server network 220 of FIG. 2 or any combination of one or more of its components (e.g., the firewall component 222, the firewall rule service 224, the server application 226, the AAM component 228).

At operation 410, the server network 220 may receive a request to update an access control list for a server application 226 from a client network 210. For example, the server network 220 may receive the request to update the access control list that is sent by the client network 210 at operation 330 of the method 300 in FIG. 3. The request to update the access control list for the server application 226 may comprise a request to update the access control list to include the external IP address for the client application 212. The request to update the access control list may also comprise an access token. In some example embodiments, the request to update the access control list may also include a request to update the access control list to include the external port identifier for the client application 212.

Next, the server network 220 may, at operation 420, obtain authorization to update the access control list using the access token of the request to update. For example, the server network 220 may transmit a request to the AAM component 228 to verify whether the requested update of the access control list is authorized. This verification request may include the access token, which the AAM component 228 can use to verify authorization for the requested update. In some example embodiments, the AAM component 228 may additionally perform a multi-factor authentication process as a part of verifying whether the requested update of the access control list is authorized, such as by the AAM component 228 sending a message (e.g., text, e-mail) to an administrative user associated with the client network 210 or the client application 212 requesting confirmation that the requested update is to be performed.

The server network 220 may then update the access control list for the server application 226 to include the external IP address for the client application 212 in response to obtaining the authorization to update the access control list, at operation 430. For example, the firewall rule service 224 may access the access control list and insert the external IP address for the client application 212 into the access control list for the server application 226. In some example embodiments, the firewall rule service 224 may also insert the external port identifier of the client application 212 into the access control list for the server application 226.

At operation 440, subsequent to the updating of the access control list, the server network 220 may receive the modified version of the request for the server application 226 to perform the action. For example, the server network 220 may receive the modified version of the request that is sent by the client network 210 at operation 340 of the method 300 in FIG. 3. The modified version of the request for the server application 226 to perform the action may specify the action and include the external IP address and external port identifier of the client application 212.

Next, the server network 220 may, at operation 450, determine that the external IP address included in the modified version of the request for the server application 226 to perform the action is included in the updated access control list. For example, the firewall rule service 224 may search or scan the updated access control list for the external IP address. In some example embodiments, the server network 220 may also determine that the external port identifier of the client application 212 is included in the updated access control list as well, such as by using the firewall rule service 224 to search or scan the update access control list for the external port identifier.

The server application 226 may then perform the action, at operation 460, based on the determining that the external IP address is included in the updated access control list. For example, in response to the firewall rule service 224 determining that the external IP address is included in the updated access control list, the firewall rule service 224 may send a notification of this determination to the firewall component 222, which may, in response to this notification, send the modified version of the request for the server application 226 to perform the action to the server application 226. The server application 226 may then perform the action, in response to receiving the modified version of the request from the firewall component 222, and then send a communication to the client network 210 based on the performance of the action, such as a response that includes a query result for a database query that was requested by the client application 212 in the modified version of the request for the server application 226 to perform the action. In some example embodiments, the server application 226 may first use a further authentication and authorization process of the AAM component 228 before performing the action. For example, the server application 226 may require that the AAM component 228 successfully perform a multi-factor authentication process as a condition for the server application 226 to perform the action, such as the AAM component 228 sending a message (e.g., text, e-mail) to a user associated with the client network 210 or the client application 212 requesting confirmation that the action is to be performed.

It is contemplated that any of the other features described within the present disclosure can be incorporated into the method 400. For example, the operations of the method 300 of FIG. 3 may be incorporated into the method 400 of FIG. 4, or the operations of the method 400 of FIG. 4 may be incorporated into the method 300 of FIG. 3.

Figure 5:
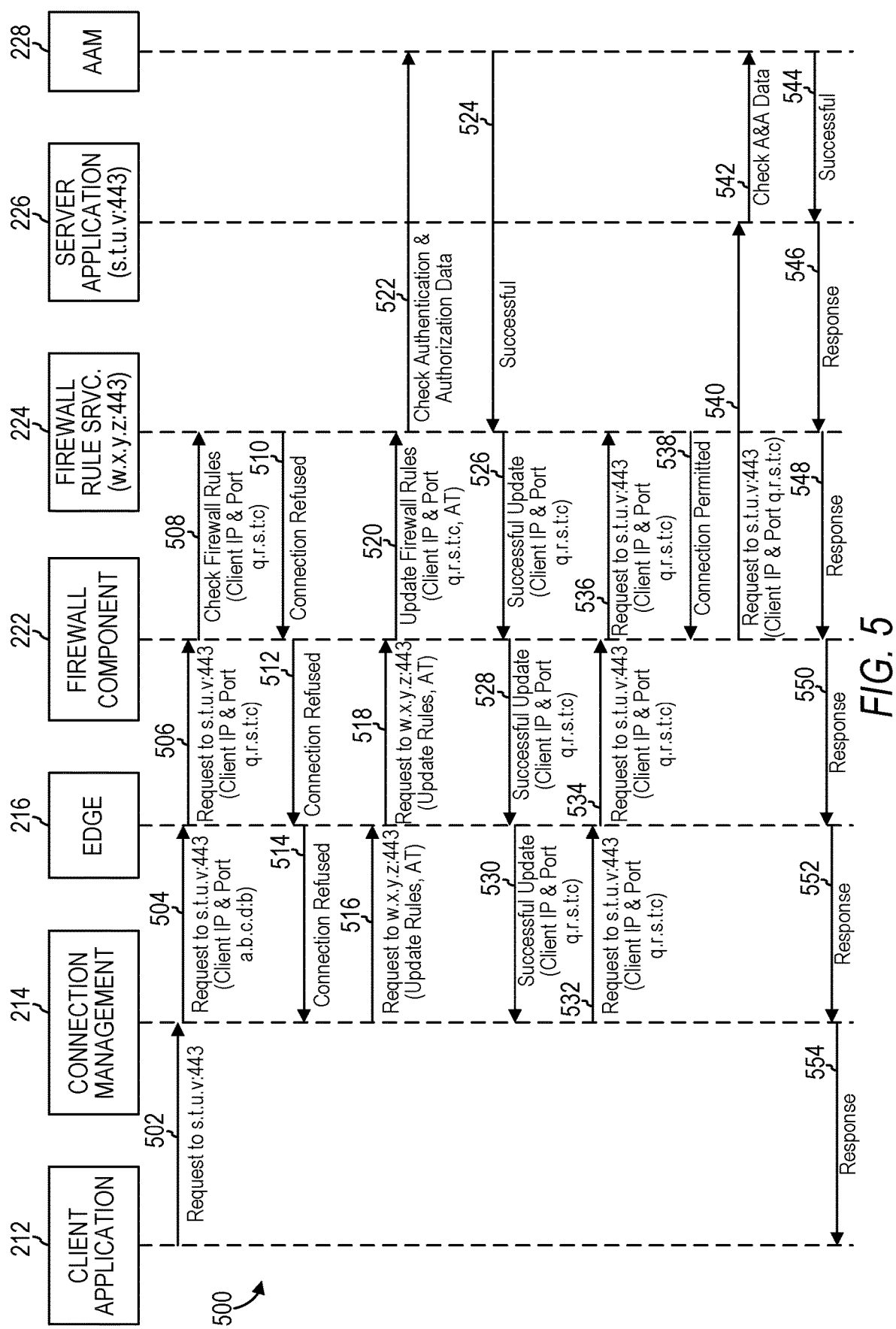
FIG. 5 is a sequence diagram illustrating yet another example method of implementing intelligent firewall rule handling.

FIG. 5 is a sequence diagram illustrating yet another example method of implementing intelligent firewall rule handling. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the access control system 200 of FIG. 2 or any combination of one or more of its components (e.g., by the client network 210, the server network 220).

At operation 502, the client application 212 may attempt to setup a network connection (e.g., a TCP/IP connection) with the server application 226 for the execution of requests. In the example shown in FIG. 5, the client application 212 has an internal IP address of "a.b.c.d" and an internal port identifier of "b," and the server application 226 has an IP address of "s.t.u.v" and a port identifier of "443." The client application 212 may send a request for the server application 226 to perform an action (e.g., an execution of a database query) using the connection management component 214 for connectivity and request handling.

The connection management component 214 may receive the request from the client application 212 and, at operation 504, route the request through the edge component 216, which may be configured to handle communication with components that are outside of the internal infrastructure of the client network 210. The edge component 216, which may comprise a router, may translate the internal IP address "a.b.c.d" and the internal port identifier "b" included in the request into an external IP address "q.r.s.t" and an external port identifier "c," respectively, at operation 506, and send a modified version of the request for the server application 226 to perform the action to the firewall component 222, hiding the internal IP address and the internal port identifier from external exposure by substituting the external IP address "q.r.s.t" and the external port identifier "c" for the internal IP address "a.b.c.d" and the internal port identifier "b."

The firewall component 222 may safeguard communication to the server application 226 using a firewall, at operation 508. The firewall component 222 may receive the modified version of the request from the edge component 216 and check the access control list for the server application 226, at operation 508, using the firewall rule service 224 to determine whether to grant or deny access to the server application 226 for the external IP address and the external port identifier.

At operation 510, the firewall rule service checks the access control list and rejects the requested access based on the determination that the external IP address and the external port identifier are not included in the access control list. The firewall rule service 224 may return an error message indicating that the requested connection has been refused to the firewall component 222, which may send the error message to the edge component 216, at operation 512. The edge component 216 may then, at operation 514, forward the error message to the connection management component 214.

At operation 516, in response to the error message, the connection management component 214 may initiate a request to update the access control list to include the external IP address and the external port identifier. The connection management component 214 may generate the request to include the external IP address and the external port identifier, as well as an access token (AT), and then send the request to update the access control list to the edge component 216 for sending to the server application 226. In some example embodiments, the edge component 216 determines the external IP address and the external port identifier and includes them in the header of the request. The edge component 216 may send the request to update the access control list to the firewall component 222, at operation 518.

Next, the firewall component 222 may, at operation 520, forward the request to update the access control list to the firewall rule service 224. At operation 522, the firewall rule service 224 may check the authentication and authorization data of the request to update the access control list, such as logon data for the server application 226 and its associated authorization rights along with the access token, such as by using the AAM component 228 to perform an authentication and authorization process using the access token.

At operation 524, the AAM component 228 verifies authenticity and authorization for the requested update using the access token, and send a confirmation to the firewall rule service 224 indicating that the authentication and authorization process was successful. The firewall rule service 224 may then, at operation 526, update the access control list to include the external IP address and the external port identifier and send a notification to the firewall component 222 that the requested update has been successfully performed. Then firewall component 222 may send the confirmation of the successful update to the edge component 216, at operation 528, and the edge component 216 may forward the confirmation to the connection management component 214, at operation 530.

After receiving the confirmation of the successful update of the access control list, the connection management component 214 may, at operation 532, reinitiate the sending of the modified version of the request for the server application 226 to perform the action, sending the modified version of the request to the edge component 216, which may then send the modified version of the request to the firewall component 222, at operation 534. At operation 536, the firewall component 222 may forward the modified version of the request to the firewall rule service 224 to determine whether to permit or deny access to the server application 226 for the client application 212 by checking the updated access control list for the external IP address and the external port identifier. The firewall rule service 224 may, at operation 538, determine to permit access to the server application 226 for the client application 212 based on the external IP address and the external port identifier being included in the updated access control list, and then send a notification of the permitted access to the firewall component 222.

At operation 540, the firewall component 222 may send the modified version of the request for the server application 226 to perform the action to the server application 226. The server application 226 may then, at operation 542, use the AAM component 228 to check the authentication and authorization data to see if the requested action is permitted. At operation 544, the AAM component 228 may confirm that the authentication and authorization data for the requested action has been successfully verified and send the confirmation to the server application 226. At operation 546, the server application 226 may then perform the requested action, such as executing a database query, and send a response to the client application 212, such as results of the database query. The response may be sent to the firewall rule service 224, which may forward the response to the firewall component 222, at operation 548. At operation 550, the firewall component 222 may send the response to the edge component 216, which may relay the response to the connection management component 214, at operation 552. The connection management component 214 may then, at operation 554, send the response to the client application 212.

It is contemplated that any of the other features described within the present disclosure can be incorporated into the method 500.

Figure 6:
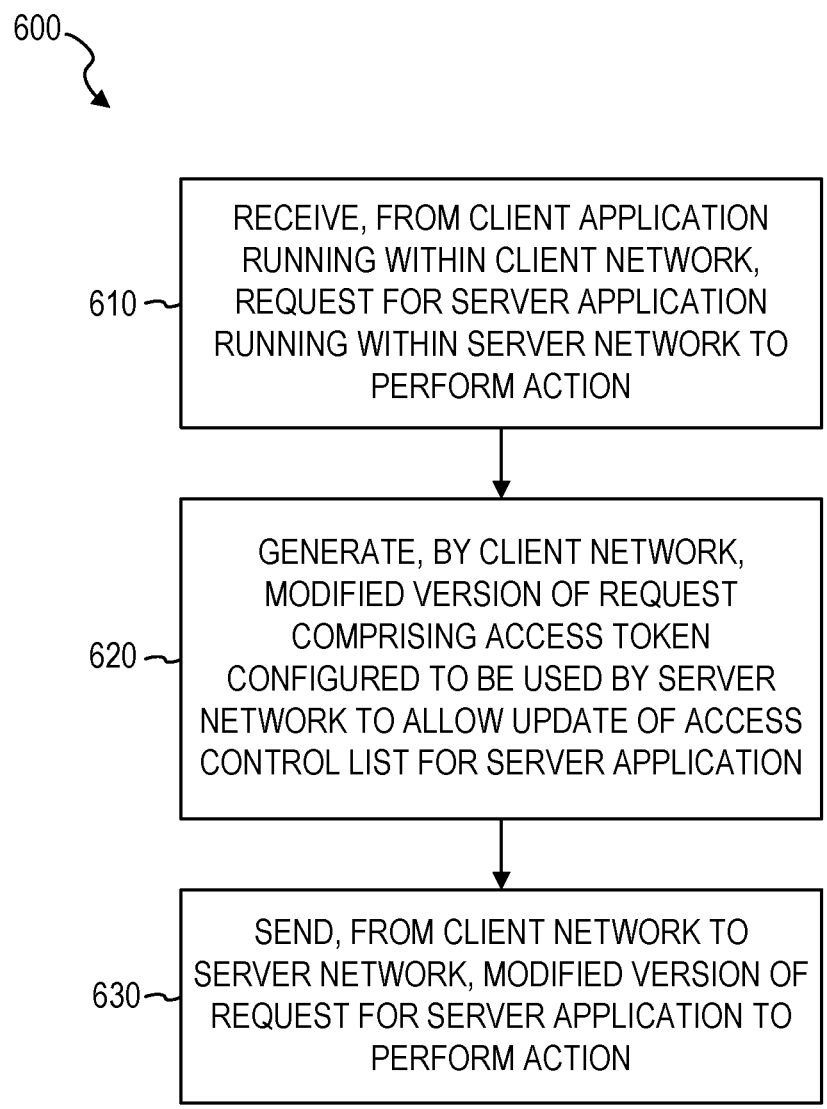
FIG. 6 is a flowchart illustrating yet another example method of implementing intelligent firewall rule handling.

FIG. 6 is a flowchart illustrating yet another example method 600 of implementing intelligent firewall rule handling. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by the client network 210 of FIG. 2 or any combination of one or more of its components (e.g., the client application 212, the client connection component 214, the edge component 216).

At operation 610, the client network 210 may receive, from a client application 212 running within the client network 210, a request for a server application 226 running within a server network 220 to perform an action. The action may comprise an execution of a database query.

Next, the client network 210 may, at operation 620, generate a modified version of the request for the server application 226 to perform the action. The modified version of the request for the server application 226 to perform the action may comprise an access token configured to be used by the server network 220 to allow an update of an access control list for the server application 226. The access token may be restricted to being valid for only a limited period of time. The access token may be restricted to being valid for only a limited set of one or more geographical locations for the client application 212. The modified version of the request may further comprise an external Internet Protocol (IP) address corresponding to an internal IP address of the client application 212. The external IP address may have been assigned to the client application 212 by an edge component 216 of the client network 210. The external IP address may have been generated by the edge component 216 using a network address translation (NAT) process. The access token may be configured to be used by the server network 220 to allow the update of the access control list for the server application 226 to include the external IP address. The modified version of the request may further comprise an external port identifier corresponding to an internal port identifier of the client application 212. The external port identifier may have been assigned to the client application 212 by the edge component 216 of the client network 210. The access token may be configured to be used by the server network 220 to allow the update of the access control list for the server application 226 to include the external port identifier.

The client network 210 may then send, to the server network 220, the modified version of the request for the server application 226 to perform the action, at operation 630. For example, the connection management component 214 may send the modified version of the request to the edge component 216, and the edge component 216 may send the modified version of the request to the server network 220, such as to the firewall component 222 of the server network 220.

It is contemplated that any of the other features described within the present disclosure can be incorporated into the method 600.

Figure 7:
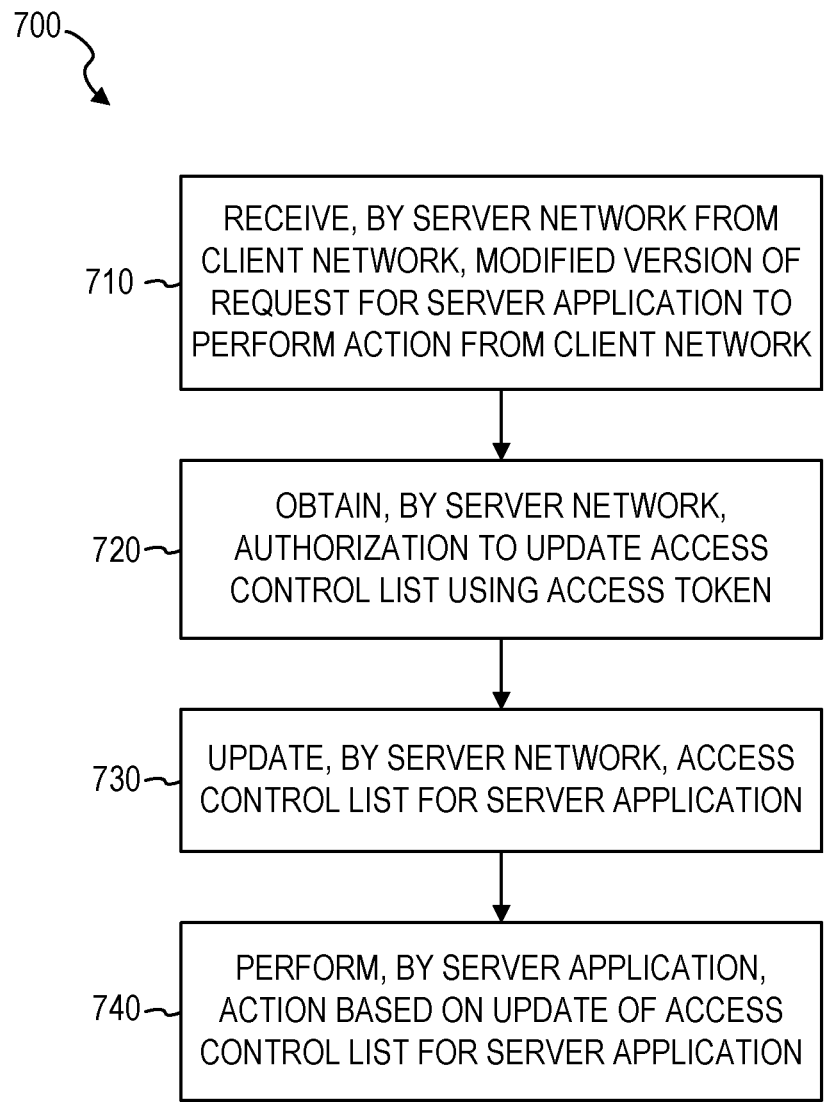
FIG. 7 is a flowchart illustrating yet another example method of implementing intelligent firewall rule handling.

FIG. 7 is a flowchart illustrating yet another example method 700 of implementing intelligent firewall rule handling. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the server network 220 of FIG. 2 or any combination of one or more of its components (e.g., the firewall component 222, the firewall rule service 224, the server application 226, the AAM component 228).

At operation 710, the server network 220 may receive, from the client network 210, the modified version of the request for the server application 226 to perform the action. For example, the server network 220 may receive the modified version of the request that was sent by the server network 220 at operation 630 of the method 600 in FIG. 6.

Next, the server network 220 may, at operation 720, obtain authorization to update the access control list using the access token of the request to update. For example, the firewall rule service 224 may communicate with the AAM component 228 using the access token to request authorization to update the access control list.

The server network 220 may then update the access control list for the server application 226 in response to obtaining the authorization to update the access control list, at operation 730. The updating of the access control list for the server application 226 may comprise updating the access control list to include an external Internet Protocol (IP) address corresponding to an internal IP address of the client application 212. The external IP address may have been assigned to the client application 212 by an edge component 216 of the client network 210. The updating of the access control list for the server application 226 may further comprise updating the access control list to include an external port identifier corresponding to an internal port identifier of the client application 212. The external port identifier may have been assigned to the client application 212 by the edge component 216 of the client network 210.

At operation 740, the server application 226 may perform the action based on the updating of the access control list for the server application 226.

It is contemplated that any of the other features described within the present disclosure can be incorporated into the method 700. For example, the operations of the method 600 of FIG. 6 may be incorporated into the method 700 of FIG. 7, or the operations of the method 700 of FIG. 7 may be incorporated into the method 600 of FIG. 6.

Figure 8:
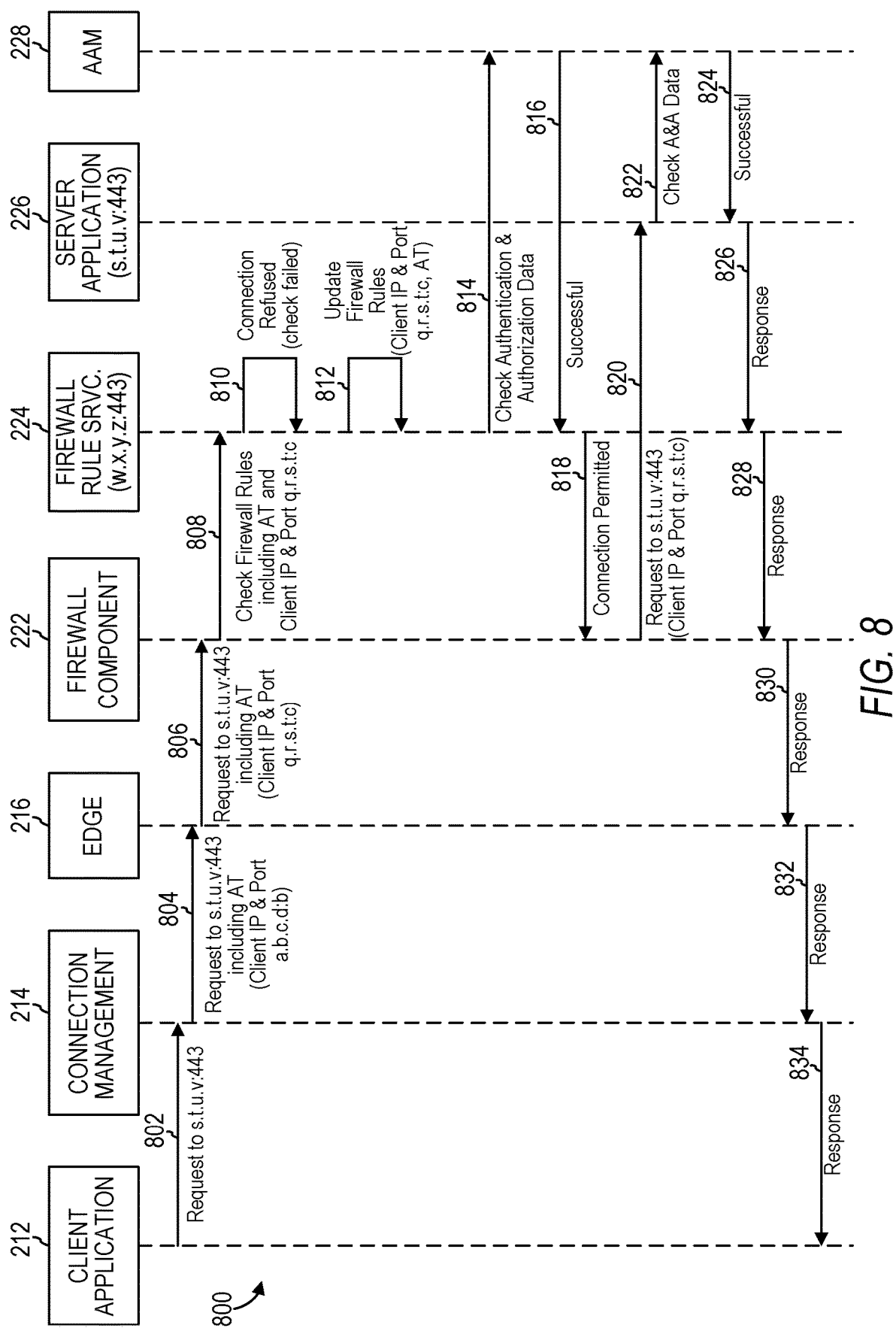
FIG. 8 is a sequence diagram illustrating yet another example method of implementing intelligent firewall rule handling.

FIG. 8 is a sequence diagram illustrating yet another example method 800 of implementing intelligent firewall rule handling. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the access control system 200 of FIG. 2 or any combination of one or more of its components (e.g., by the client network 210, the server network 220).

At operation 802, the client application 212 may attempt to setup a network connection (e.g., a TCP/IP connection) with the server application 226 for the execution of requests. In the example shown in FIG. 8, the client application 212 has an internal IP address of "a.b.c.d" and an internal port identifier of "b," and the server application 226 has an IP address of "s.t.u.v" and a port identifier of "443." The client application 212 may send a request for the server application 226 to perform an action (e.g., an execution of a database query) using the connection management component 214 for connectivity and request handling.

The connection management component 214 may receive the request from the client application 212 and, at operation 804, and generate a modified version of the request comprising an access token (AT) configured to be used to allow an update of an access control list for the server application 226. The connection management component 214 may send the modified version of the request to a component of the server network 220, such as to the firewall component 222, through the edge component 216. which may be configured to handle communication with components that are outside of the internal infrastructure of the client network 210. The edge component 216, which may comprise a router, may translate the internal IP address "a.b.c.d" and the internal port identifier "b" included in the header of the request into an external IP address "q.r.s.t" and an external port identifier "c," respectively, at operation 806, and send the modified version of the request to the firewall component 222, hiding the internal IP address and the internal port identifier from external exposure by substituting the external IP address "q.r.s.t" and the external port identifier "c" for the internal IP address "a.b.c.d" and the internal port identifier "b."

The firewall component 222 may safeguard communication to the server application 226 using a firewall, at operation 808. The firewall component 222 may receive the modified version of the request from the edge component 216 and check the access control list for the server application 226, at operation 808, using the firewall rule service 224 to determine whether to grant or deny access to the server application 226 for the external IP address and the external port identifier.

At operation 810, the firewall rule service checks the access control list and rejects the requested access based on the determination that the external IP address and the external port identifier are not included in the access control list. The firewall rule service 224 (or the firewall component 222) may then initiate a request, at operation 812, to update the access control list to include the external IP address and the external port identifier using the access token. The firewall rule service 224 (or the firewall component 222) may check the authentication and authorization data of the request to update the access control list, such as logon data for the server application 226 and its associated authorization rights along with the access token, such as by using the AAM component 228 to perform an authentication and authorization process using the access token, at operation 814.

At operation 816, the AAM component 228 verifies authenticity and authorization for the requested update using the access token, and send a confirmation to the firewall rule service 224 indicating that the authentication and authorization process was successful. The firewall rule service 224 may then, at operation 818, update the access control list to include the external IP address and the external port identifier and send a notification to the firewall component 222 that the requested update has been successfully performed. At operation 820, the firewall component 222 may send the modified version of the request for the server application 226 to perform the action to the server application 226. The server application 226 may then, at operation 822, use the AAM component 228 to check the authentication and authorization data to see if the requested action is permitted. At operation 824, the AAM component 228 may confirm that the authentication and authorization data for the requested action has been successfully verified and send the confirmation to the server application 226. At operation 826, the server application 226 may then perform the requested action, such as executing a database query, and send a response to the client application 212, such as results of the database query. The response may be sent to the firewall rule service 224, which may forward the response to the firewall component 222, at operation 828. At operation 830, the firewall component 222 may send the response to the edge component 216, which may relay the response to the connection management component 214, at operation 832. The connection management component 214 may then, at operation 834, send the response to the client application 212.

It is contemplated that any of the other features described within the present disclosure can be incorporated into the method 800.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving, from a client application running within a client network, a request for a server application running within a server network to perform an action; obtaining an external Internet Protocol (IP) address corresponding to an internal IP address of the client application, the external IP address having been assigned to the client application by an edge component of the client network; sending, from the client network to the server network, a request to update an access control list for the server application to include the external IP address for the client application, the request to update the access control list comprising an access token configured to be used by the server network to allow the update of the access control list; and subsequent to the sending of the request to update the access control list, sending, from the client network to the server network, a modified version of the request for the server application to perform the action, the modified version of the request for the server application to perform the action including the external IP address.

Example 2 includes the computer-implemented method of example 1, wherein the action comprises an execution of a database query.

Example 3 includes the computer-implemented method of example 1 or example 2, wherein the external IP address has been generated by the edge component using a network address translation (NAT) process.

Example 4 includes the computer-implemented method of any one of examples 1 to 3, wherein the obtaining the external IP address further comprises obtaining an external port identifier corresponding to an internal port identifier of the client application, the external port identifier having been assigned to the client application by the edge component of the client network; the request to update the access control list for the server application to include the external IP address for the client application further comprises a request to include the external port identifier of the client application; and the modified version of the request for the server application to perform the action further includes the external port identifier.

Example 5 includes the computer-implemented method of any one of examples 1 to 4, wherein the sending of the request to update the access control list for the server application to include the external IP address for the client application is performed in response to receiving, from the server network, a denial of a request by the client application to access the server application.

Example 5 includes the computer-implemented method of any one of examples 1 to 4, wherein the access token is restricted to being valid for only a limited period of time.

Example 6 includes the computer-implemented method of any one of examples 1 to 5, wherein the access token is restricted to being valid for only a limited set of one or more geographical locations for the client application.

Example 7 includes the computer-implemented method of any one of examples 1 to 6, further comprising: receiving, by the server network, the request to update the access control list from the client network; obtaining, by the server network, authorization to update the access control list using the access token of the request to update; and updating, by the server network, the access control list for the server application to include the external IP address for the client application in response to obtaining the authorization to update the access control list.

Example 8 includes the computer-implemented method of any one of examples 1 to 7, further comprising: subsequent to the updating of the access control list, receiving, by the server network, the modified version of the request for the server application to perform the action; determining, by the server network, that the external IP address included in the modified version of the request for the server application to perform the action is included in the updated access control list; and performing, by the server application, the action based on the determining that the external IP address is included in the updated access control list.

Example 9 includes the computer-implemented method of any one of examples 1 to 8, wherein: the obtaining the external IP address further comprises obtaining an external port identifier corresponding to an internal port identifier of the client application, the external port identifier having been assigned to the client application by the edge component of the client network; the request to update the access control list for the server application to include the external IP address for the client application further comprises a request to include the external port identifier of the client application; and the updating of the access control list for the server application to include the external IP address for the client application further comprises updating the access control list for the server application to include the external port identifier of the client application.

Example 10 includes the computer-implemented method of any one of examples 1 to 9, further comprising: subsequent to the updating of the access control list, receiving, by the server network, the modified version of the request for the server application to perform the action; determining, by the server network, that the external IP address included in the modified version of the request for the server application to perform the action is included in the updated access control list; and performing, by the server application, the action based on the determining that the external IP address is included in the updated access control list.

Example 11 includes the computer-implemented method of any one of examples 1 to 10, wherein: the obtaining the external IP address further comprises obtaining an external port identifier corresponding to an internal port identifier of the client application, the external port identifier having been assigned to the client application by the edge component of the client network; the request to update the access control list for the server application to include the external IP address for the client application further comprises a request to include the external port identifier of the client application; the updating of the access control list for the server application to include the external IP address for the client application further comprises updating the access control list for the server application to include the external port identifier of the client application; the modified version of the request for the server application to perform the action further includes the external port identifier; the determining that the external IP address is included in the updated access control list further comprises determining that the external port identifier of the client application is included in the updated access control list; and the performing of the action is further based on the determining that the external port identifier is included in the updated access control list.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 9:
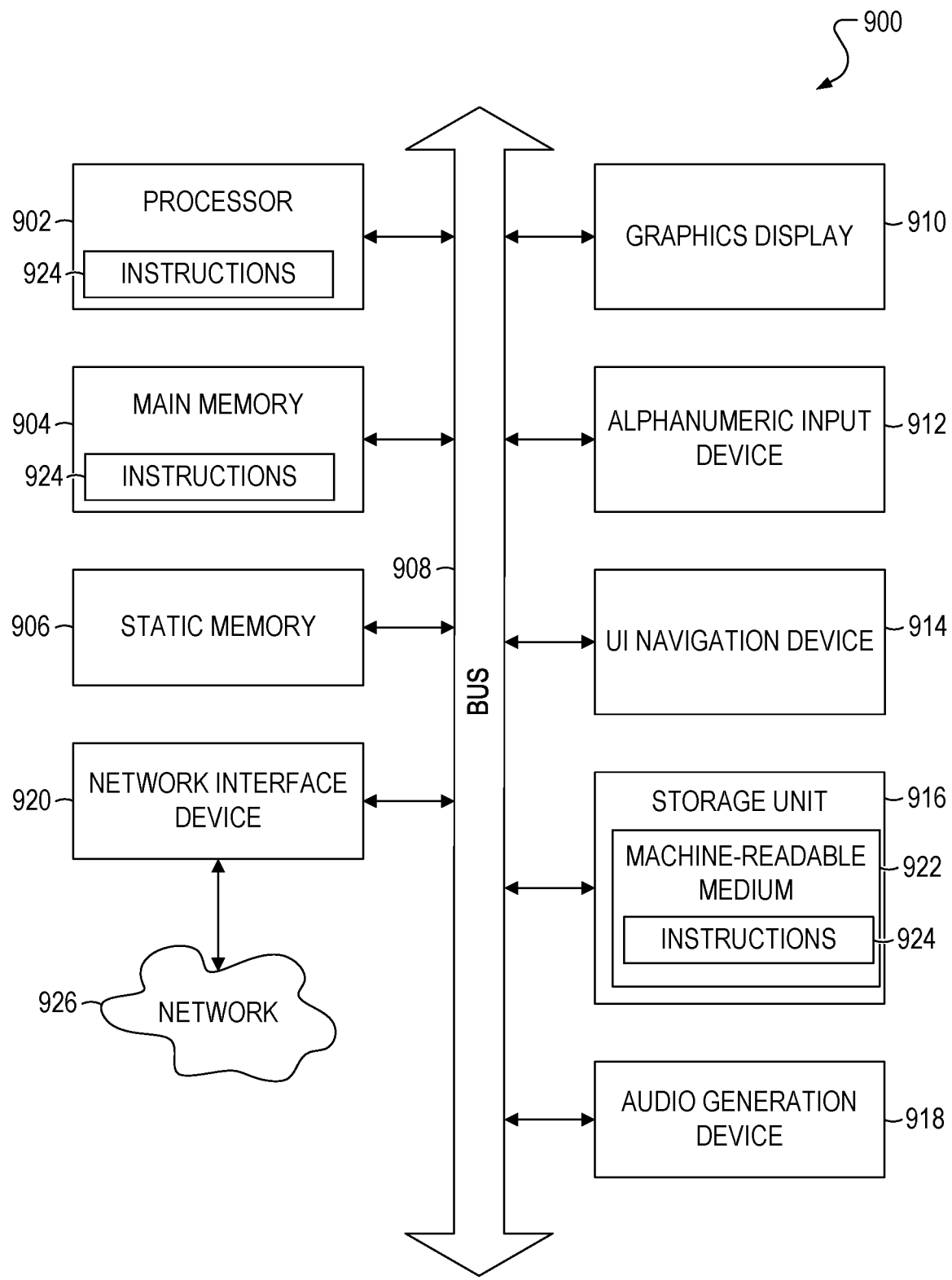
FIG. 9 is a block diagram of an example computer system on which methodologies described herein can be executed.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   receiving, from a client application running within a client network, a first request for a server application running within a server network to perform an action, the first request comprising an internal Internet Protocol (IP) address of the client application;
   modifying the first request by replacing the internal IP address of the client application with an external IP address;
   sending the modified first request to a firewall rule service;
   rejecting, by the firewall rule service and based on the external IP address and an access control list for the server application, the modified first request;
   receiving, in response to the rejection, a second request to update the access control list for the server application to allow the external IP address;
   based on the second request, updating, by the firewall rule service, the access control list to allow the external IP address; and
   resending the modified first request to the firewall rule service.

2. The computer-implemented method of claim 1, wherein the action comprises an execution of a database query.

3. The computer-implemented method of claim 1, wherein the second request includes an access token that is restricted to being valid for only a limited period of time.

4. The computer-implemented method of claim 1, wherein the second request includes an access token that is restricted to being valid for only a limited set of one or more geographical locations for the client application.

5. The computer-implemented method of claim 1, wherein the external IP address was assigned to the client application by an edge component of the client network.

6. The computer-implemented method of claim 5, wherein the external IP address has been generated by the edge component using a network address translation (NAT) process.

7. The computer-implemented method of claim 5, wherein the modified first request further comprises an external port identifier corresponding to an internal port identifier of the client application, the external port identifier having been assigned to the client application by the edge component of the client network.

8. The computer-implemented method of claim 7, wherein the second request includes an access token that is configured to be used by the server network to allow the update of the access control list for the server application to include the external port identifier.

9. A system of comprising:
   at least one hardware processor; and
   a non-transitory computer-readable medium storing executable instructions that, when executed, cause the at least one hardware processor to perform computer operations comprising:
      receiving, from a client application running within a client network, a first request for a server application running within a server network to perform an action, the first request comprising an internal Internet Protocol (IP) address of the client application;
      modifying the first request by replacing the internal IP address of the client application with an external IP address;
      sending the modified first request to a firewall rule service;
      rejecting, by the firewall rule service and based on the external IP address and an access control list for the server application, the first request from the client application;
      receiving, in response to the rejection, a second request to update the access control list for the server application to allow the external IP address;
      based on the second request, updating, by the firewall rule service, the access control list to allow the external IP address; and
      resending the modified first request to the firewall rule service.

10. The system of claim 9, wherein the action comprises an execution of a database query.

11. The system of claim 9, wherein the second request includes an access token that is restricted to being valid for only a limited period of time.

12. The system of claim 9, wherein the second request includes an access token that is restricted to being valid for only a limited set of one or more geographical locations for the client application.

13. The system of claim 9, wherein the external IP address was assigned to the client application by an edge component of the client network.

14. The system of claim 13, wherein the external IP address has been generated by the edge component using a network address translation (NAT) process.

15. The system of claim 13, wherein the modified first request further comprises an external port identifier corresponding to an internal port identifier of the client application, the external port identifier having been assigned to the client application by the edge component of the client network.

16. The system of claim 15, wherein the second request includes an access token that is configured to be used by the server network to allow the update of the access control list for the server application to include the external port identifier.

17. A non-transitory machine-readable storage medium tangibly embodying a set of instructions that, when executed by at least one hardware processor, causes the at least one hardware processor to perform computer operations comprising:

receiving, from a client application running within a client network, a first request for a server application running within a server network to perform an action, the first request comprising an internal Internet Protocol (IP) address of the client application;

modifying the first request by replacing the internal IP address of the client application with an external IP address;

sending the modified first request to a firewall rule service;

rejecting, by the firewall rule service and based on the external IP address and an access control list for the server application, the first request from the client application;

receiving, in response to the rejection, a second request to update the access control list for the server application to allow the external IP address;

based on the second request, updating, by the firewall rule service, the access control list to allow the external IP address; and resending the modified first request to the firewall rule service.

18. The non-transitory machine-readable storage medium of claim 17, wherein the action comprises an execution of a database query.

19. The non-transitory machine-readable storage medium of claim 17, wherein the second request includes an access token that is restricted to being valid for only a limited period of time.

20. The non-transitory machine-readable storage medium of claim 17, wherein the second request includes an access token that is restricted to being valid for only a limited set of one or more geographical locations for the client application.

* * * * *